United States Patent
Kishimoto (10) Patent No.: US 7,269,535 B2
(45) Date of Patent: Sep. 11, 2007

(54) FAULT DIAGNOSING APPARATUS FOR VEHICLE AND FAULT DIAGNOSING METHOD FOR VEHICLE

(75) Inventor: Takeshi Kishimoto, Nagoya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 11/369,963

(22) Filed: Mar. 8, 2006

(65) Prior Publication Data
US 2006/0224360 A1  Oct. 5, 2006

(30) Foreign Application Priority Data
Mar. 30, 2005  (JP)  ............... 2005-097519

(51) Int. Cl.
*G06F 11/30* (2006.01)

(52) U.S. Cl. ............ 702/183; 702/182; 702/185

(58) Field of Classification Search ........... 702/30, 702/34, 57, 58, 116, 182, 183, 185; 701/29, 701/30, 34; 324/771, 772; 340/649, 650
See application file for complete search history.

(56) References Cited

U.S. PATENT DOCUMENTS 6,366,208 B1 * 4/2002 Hopkins et al. ............ 340/650

6,784,687 B2 * 8/2004 Tamura ...................... 324/772

FOREIGN PATENT DOCUMENTS

| JP | A 2000-134707 | 5/2000 |
| JP | A 2003-102101 | 4/2003 |
| JP | A 2004-303691 | 10/2004 |

* cited by examiner

*Primary Examiner*—Bryan Bui
(74) *Attorney, Agent, or Firm*—Oliff & Berridge, PLC (57) ABSTRACT

A vehicle includes a direct current power supply (supply), an electric circuit (circuit) supplied with a current from the supply, a connector with relays that connects and disconnects a path supplying the current to the circuit, and a voltage sensor (sensor) that monitors the path between the connector and the circuit. A controller provides control to connect and disconnect the connector. The controller then brings part of the relays into conduction to provisionally determine conduction fault of a relay that is to be non-conductive in accordance with an output of the sensing portion. When a result indicates fault, the controller stores the sensor output as a first value, brings some relays out of conduction, brings other relays into conduction, and compares the value and the sensor output to determine whether to confirm the provisional determination. Thus, fault diagnosis time is reduced.

8 Claims, 4 Drawing Sheets

FAULT DIAGNOSING APPARATUS FOR VEHICLE AND FAULT DIAGNOSING METHOD FOR VEHICLE

This nonprovisional application is based on Japanese Patent Application No. 2005-097519 filed with the Japan Patent Office on Mar. 30, 2005, the entire contents of which are hereby incorporated by reference.

BACKGROUND OF THE INVENTION

1. Field of the Invention

The present invention relates to a fault diagnosing apparatus for a vehicle and a fault diagnosing method for a vehicle.

2. Description of the Background Art

A vehicle, which has an electric motor generating the driving force, such as a hybrid vehicle, an electric vehicle and a fuel cell vehicle, incorporates a power supply system having a high voltage power supply. Here, a plurality of relays are provided between the high voltage power supply and an electric power converting circuit (inverter) for controlling connection and disconnection of the circuit.

In such a circuit, if the relays are connected when they actually should be released, the lifetime of the power supply may be reduced or devices connected to the circuit may be damaged due to a current from the high voltage power supply.

Accordingly, Japanese Patent Laying-Open No. 2004-303691 discloses a method for determining melting adhesion of relays in order to prevent such problems. According to the determining method, when melting adhesion is detected upon a melting adhesion check, a discharge process for discharging the stored charges in a smoothing capacitor is conducted and thereafter the melting adhesion check is again conducted, so that fault that is solved instantly is not detected.

Relays for connecting and disconnecting a high voltage battery and a high voltage system in a hybrid system have a mechanical drive mechanism employing an excitation coil. Thus, in some cases the system may not operate because of a temporary incidental factor such as dust clogging the drive unit. Such a failure is unlikely to be repeated, and may be solved easily by conducted on/off operations again.

Accordingly, even when melting adhesion of the relays is detected, the fault may not be confirmed on single detection, and on/off operations may be conducted again to thereafter conduct detection of melting adhesion again. In such a case, still a prolonged processing time for the fault determination is not preferable.

Repeating the discharge process as shown in Japanese Patent Laying-Open No. 2004-303691, the fault determination is delayed by the time required for charging and discharging the smoothing capacitor. An improvement may be made in order to notify the driver of the fault as soon as possible.

SUMMARY OF THE INVENTION

An object of the present invention is to provide a fault diagnosing apparatus and a fault diagnosing method which reduce a time for a fault diagnosis.

Summarizing the present invention, a fault diagnosing apparatus for a vehicle is provided. The vehicle includes a direct current power supply, an electric circuit supplied with a current from the direct current power supply, a connecting portion that includes a plurality of relays and that connects and disconnects a path supplying the current from the direct current power supply to the electric circuit, and a sensing portion monitoring the path between the connecting portion and the electric circuit. The fault diagnosing apparatus includes a control portion providing control to connect and disconnect the connecting portion. The control portion brings part of the plurality of relays into conduction to make a provisional determination of conduction fault of a relay that is to be non-conductive in accordance with an output of the sensing portion, and when a result of the provisional determination indicates fault, the control portion stores the output of the sensing portion as a first value and provides control to once change a state of at least one of the plurality of relays and to return the changed state back, and thereafter compares the first value and the output of the sensing portion to determine whether or not to confirm the provisional determination.

Preferably, one of the plurality of relays is a first relay connecting a positive electrode side of the direct current power supply to the electric circuit, and another one of the plurality of relays is a second relay connecting a negative electrode side of the direct current power supply to the electric circuit.

Preferably, the vehicle further includes a capacitor smoothing a voltage applied from the connecting portion to the electric circuit. The sensing portion includes a voltage sensor sensing a voltage between terminals of the capacitor. The controlling portion allows the electric circuit to operate to discharge the capacitor, and thereafter makes the provisional determination.

Further preferably, the controlling portion confirms the provisional determination when a voltage value indicated by an output of the sensing portion is increased from a voltage value indicated by the first value when the part of the plurality of relays are again brought into conduction.

According to another aspect of the present invention, a fault diagnosing method for a vehicle is provided. The vehicle includes a direct current power supply, an electric circuit supplied with a current from the direct current power supply, a connecting portion that includes a plurality of relays and that connects and disconnects a path supplying the current from the direct current power supply to the electric circuit, and a sensing portion monitoring the path between the connecting portion and the electric circuit. The fault diagnosing method includes the steps of: bringing part of the plurality of relays into conduction to make a provisional determination of conduction fault of a relay that is to be non-conductive in accordance with an output of the sensing portion; when a result of the provisional determination indicates fault, storing the output of the sensing portion as a first value; when the result of the provisional determination indicates fault, providing control to once change a state of at least one of the plurality of relays and to return the changed state back; and comparing the first value and the output of the sensing portion to determine whether or not to confirm the provisional determination.

Preferably, one of the plurality of relays is a first relay connecting a positive electrode side of the direct current power supply to the electric circuit, and another one of the plurality of relays is a second relay connecting a negative electrode side of the direct current power supply to the electric circuit.

Preferably, the vehicle further includes a capacitor smoothing a voltage applied from the connecting portion to the electric circuit. The sensing portion includes a voltage sensor sensing a voltage between terminals of the capacitor. The fault diagnosing method further includes a step of, prior to the step of making a provisional determination, allowing the electric circuit to operate to discharge the capacitor.

Further preferably, the fault diagnosing method confirms the provisional determination when a voltage value indicated by an output of the sensing portion is increased from a voltage value indicated by the first value in the step of determining whether or not to confirm the provisional determination.

Thus, the present invention has a primary effect of reducing the time required for a fault diagnosis and notifying the driver of the fault immediately.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, referring to the drawings, an embodiment of the present invention will be described in detail. The same or corresponding parts are denoted by the same reference character, and description thereof will not be repeated.

Figure 1:
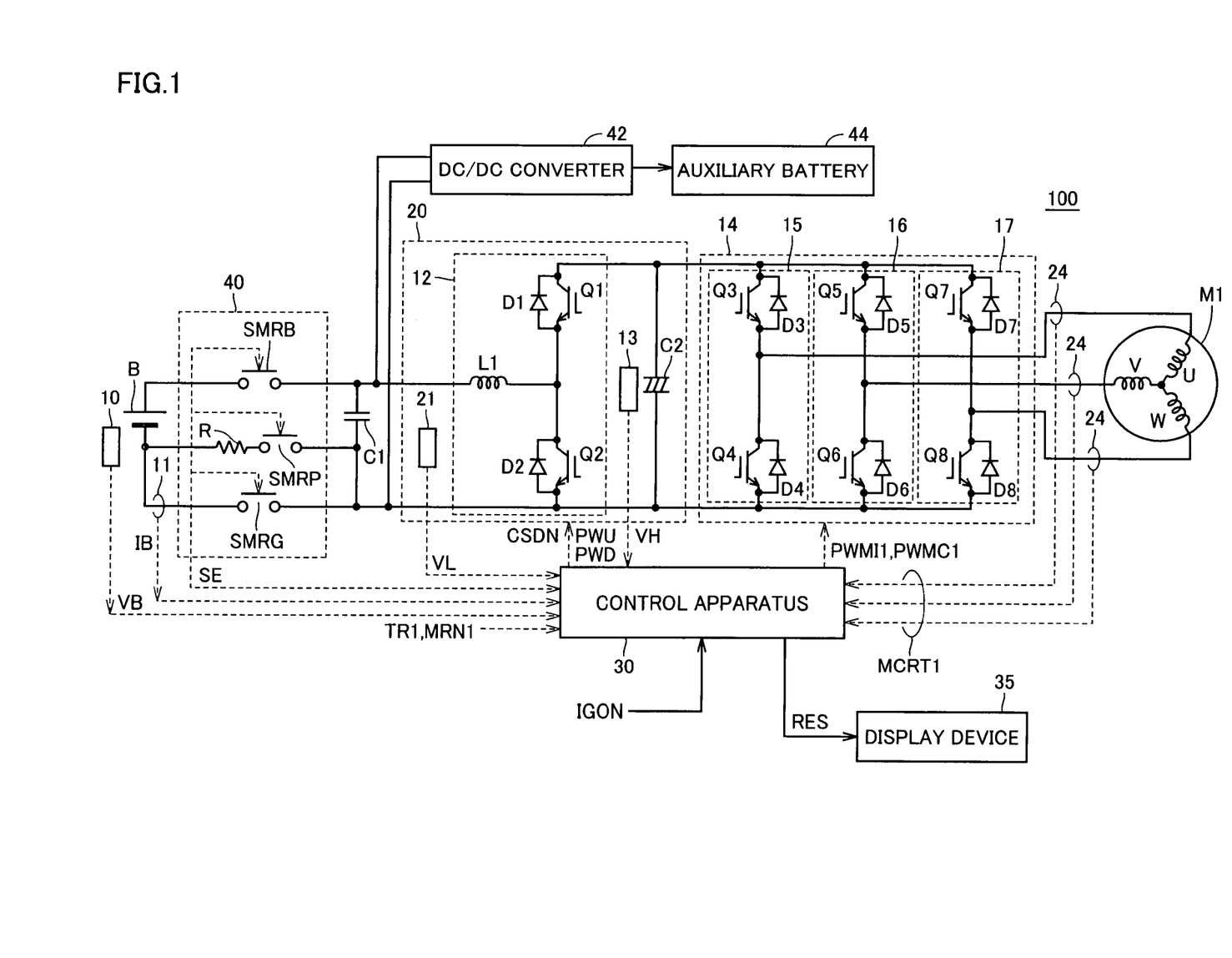
FIG. 1 is a circuit diagram showing a configuration of a vehicle 100 according to an embodiment of the present invention.

FIG. 1 is a circuit diagram showing a configuration of a vehicle 100 according to the embodiment of the present invention. It is noted that vehicle 100 may be any of an electric vehicle or a fuel cell vehicle having their wheels driven by a motor, or a hybrid vehicle employing both the motor and the engine for driving the vehicle.

Referring to FIG. 1, vehicle 100 includes a DC (Direct Current) power supply B, a voltage sensor 10, a current sensor 11, a connecting portion 40, a capacitor C1, a voltage converter 20, an inverter 14, a motor M1 for driving wheels, a current sensor 24, and a control apparatus 30.

DC power supply B is a secondary battery such as a nickel-hydride metal battery or a lithium-ion battery. Voltage sensor 10 detects a DC voltage value VB output from DC power supply B and provides the detected DC voltage value VB to control apparatus 30. Current sensor 11 detects a DC current passing from DC power supply B via connecting portion 40 to the electric circuit, and provides control apparatus 30 with the detected current as a DC current value IB. Capacitor C1 smoothes the voltage applied from the connecting portion to the electric circuit.

Voltage converter 20 includes a voltage sensor 21, a booster converter 12, a capacitor C2, and a voltage sensor 13.

Booster converter 12 includes: a reactor L1 having one end connected via connecting portion 40 to a positive electrode of DC power supply B; IGBT (Insulated Gate Bipolar Transistor) elements Q1, Q2 serially connected between output terminals of booster converter 12 outputting a voltage VH; and diodes D1, D2 connected in parallel to IGBT elements Q1, Q2, respectively.

Reactor L1 has the other end connected to the emitter of IGBT element Q1 and the collector of IGBT element Q2. Diode D1 has its cathode connected to the collector of IGBT element Q1, and has its anode connected to the emitter of IGBT element Q1. Diode D2 has its cathode connected to the collector of IGBT element Q2, and has its anode connected to the emitter of IGBT element Q2.

Voltage sensor 21 senses the voltage on the input side of booster converter 12 as a voltage value VL. Capacitor C2 is connected to the output side of booster converter 12 for storing the energy from booster converter 12 and smoothing the voltage. Voltage sensor 13 senses the voltage on the output side of booster converter 12, i.e., a voltage between the electrodes of capacitor C2, as a voltage value VH.

Inverter 14 receives a boosted potential from booster converter 12 and drives AC (Alternating Current) motor M1. Inverter 14 returns electric power generated by AC motor M1 in accordance with regenerative braking back to booster converter 12. Here, booster converter 12 is controlled by control apparatus 30 so that it operates as a step-down circuit.

AC motor M1 is a motor for generating torque for driving the driving wheels of a hybrid vehicle or an electric vehicle. For example, this motor may be incorporated in the hybrid vehicle as a device that have a function of a generator driven by an engine, and that can operate as an electric motor to the engine and capable of starting the engine.

Inverter 14 includes a U-phase arm 15, a V-phase arm 16 and a W-phase arm 17. U-phase arm 15, V-phase arm 16 and W-phase arm are connected in parallel in the output line of booster converter 12.

U-phase arm 15 includes a serially-connected IGBT elements Q3, Q4, and diodes D3, D4 connected in parallel to IGBT elements Q3, Q4, respectively. Diode D3 has its cathode connected to the collector of IGBT element Q3, and has its anode connected to the emitter of IGBT element Q3. Diode D4 has its cathode connected to the collector of IGBT element Q4, and has its anode connected to the emitter of IGBT element Q4.

V-phase arm 16 includes a serially-connected IGBT elements Q5, Q6, and diodes D5, D6 connected in parallel to IGBT elements Q5, Q6, respectively. Diode D5 has its cathode connected to the collector of IGBT element Q5, and has its anode connected to the emitter of IGBT element Q5. Diode D8 has its cathode connected to the collector of IGBT element Q6, and has its anode connected to the emitter of IGBT element Q6.

W-phase arm 17 includes a serially-connected IGBT elements Q7, Q8, and diodes D7, D8 connected in parallel to IGBT elements Q7, Q8, respectively. Diode D7 has its cathode connected to the collector of IGBT element Q7, and has its anode connected to the emitter of IGBT element Q7. Diode D6 has its cathode connected to the collector of IGBT element Q8, and has its anode connected to the emitter of IGBT element Q8.

The phase arms have their intermediate nodes connected to phase terminals of phase coils of AC motor M1, respectively. Specifically, AC motor M1 is a three-phase permanent magnet motor wherein three coils of U, V and W phases have their one ends commonly connected to an intermediate node. U-phase coil has the other end connected to a connecting node of IGBT elements Q3, Q4. V-phase coil has the other end connected to a connecting node of IGBT elements Q5, Q6. W-phase coil has the other end connected to a connecting node of IGBT elements Q7, Q8.

Current sensor 24 senses a current passing through AC motor M1 as a motor current value MCRT1, and provides motor current value MCRT1 to control apparatus 30.

Control apparatus 30 receives a torque command value TR1, a motor rotation number MRN1, voltage values VB, VL and VH, current value IB and motor current value MCRT1. Control apparatus 30 outputs to voltage converter 20 a control signal PWU instructing to boost, a control signal PWD instructing to step-down, and operation prohibit signal CSDN. Further, control apparatus 30 outputs to inverter 14 a drive instruction PWMI1 instructing to convert a DC voltage output from booster converter 12 into an AC voltage for driving motor M1, and a regeneration instruction PWMC1 instructing to convert an AC voltage generated by motor M1 into a DC voltage and to return it to booster converter 12 side.

Next, an operation of voltage converter 20 is briefly described. Booster converter 12 in voltage converter 20 operates as a booster circuit as a forward-direction converter circuit that supplies power from DC power supply B to inverter 14 during the powering drive. Conversely, during the regenerative driving, booster converter 12 operates as a step-down circuit as a reverse-direction converter circuit that regenerates power generated by motor M1 to DC power supply B.

Booster converter 12 operates as a booster circuit, by bringing IGBT element Q2 into and out of conduction repeatedly in a state where IGBT element Q1 is brought out of conduction. Specifically, when IGBT element Q2 is conductive, a path is formed through which a current passes from the positive electrode of DC power supply B via reactor L1 and IGBT element Q2 to the negative electrode of DC power supply B. While this current passes, energy is stored in reactor L1.

When IGBT element Q2 is brought out of conduction, the energy having been stored in reactor L1 flows via diode D1 toward inverter 14 side. Thus, the voltage between the electrodes of capacitor C2 increases. Therefore, the output voltage of booster converter 12 provided to inverter 14 increases.

On the other hand, booster converter 12 operates as a step-down circuit, by bringing IGBT element Q1 into and out of conduction repeatedly in a state where IGBT element Q2 is brought out of conduction. Specifically, in a state where IGBT element Q1 is conductive, a current regenerated from inverter 14 flows through IGBT element Q1, reactor L1, and DC power supply B.

When IGBT element Q1 is non-conductive, a loop made of reactor L1, DC power supply B and diode D2 is formed, and the energy having been stored in reactor L1 is regenerated to DC power supply B. In this inverse direction conversion, the time during which DC power supply B receives power is longer than the time during which inverter 14 supplies power, and the voltage of inverter 14 is stepped down and regenerated to DC power supply B. The operation of voltage converter 20 is achieved by appropriately controlling the above-described powering operation and regenerative operation.

It is noted that the regenerative control includes braking associated with regeneration when the driver of a hybrid vehicle or an electric vehicle presses the foot brake. Except for pressing the foot brake, it includes turning off the acceleration pedal during traveling to cause regeneration, to thereby decelerate or stop acceleration of the vehicle.

Next, the structure and control of connecting portion 40 is described. The connecting portion 40 serves to connect and disconnect a path for supplying a current from DC power supply B to voltage converter 20.

Connecting portion 40 includes a system main relay SMRB serially connected between the positive electrode of DC power supply B and one end of reactor L1, and a system main relay SMRG connected between the negative electrode of DC power supply B and the emitter of IGBT element Q2. Connecting portion 40 further includes a serially connected system main relay SMRP and a limiting resistor R, connected in parallel to system main relay SMRB.

System main relay SMRB is a relay connecting the positive electrode side of DC power supply B to the electric circuit. System main relays SMRP, SMRG are relays connecting the negative electrode side of DC power supply B to the electric circuit.

System main relays SMRP, SMRB and SMRG has their respective conductive/non-conductive states controlled with a prescribed sequence by a signal SE from control apparatus 30. More specifically, when actuated, system main relays SMRP, SMRB are controlled to be conductive, while system main relay SMRG is controlled to be non-conductive. Thus, a current is supplied via limiting resistor R, and an excessive inrush current is prevented from passing. In this state, in booster converter 12, IGBT element Q1 is controlled to be conductive and IGBT element Q2 is controlled to be non-conductive, and capacitor C2 is charged. This charging operation is referred to as a precharge operation.

When the precharge operation ends, system main relays SMRB and SMRG are controlled to be conductive, and system main relay SMRP is controlled to be non-conductive. Thus, a current can be supplied from DC power supply B to booster converter 12 not via limit register R. When the precharge operation has conducted normally and booster converter 12 is prepared to operate, an indicator of ReadyOn of a display device 35 turns on.

Vehicle 100 further includes a DC/DC converter 42 supplied with a current from DC power supply B via connecting portion 40, and an auxiliary battery 44 supplied with a charging voltage from DC/DC converter 42. DC/DC converter 42 corresponds to a load circuit supplied with a power supply current from DC power supply B.

When the driver sets the ignition switch to off, for example, control apparatus 30 brings part of a plurality of system main relays SMRB, SMRP and SMRG into conduction. Control apparatus 30 performs a provisional determination of conduction fault of a relay that should be non-conductive in accordance with an output of voltage sensor 21. When the result of the provisional determination indicates fault, the output of voltage sensor 21 is stored as a first value, and part of the relays is once brought out of conduction. Bringing that part of the relays into conduction again and comparing the first value and an output of voltage sensor 21, whether or not to confirm the provisional determination is determined.

Specifically, control apparatus 30 allows DC/DC converter 42 to operate so that capacitor C1 is discharged. Thereafter, first, control apparatus 30 brings only part of relays, i.e., system main relay SMRP into conduction so that a charging circuit to capacitor C1 is not formed. Then, monitoring an output of voltage sensor 21 to see if capacitor C1 is charged, control apparatus 30 performs a provisional determination of melting adhesion of system main relay SMRB.

If melting adhesion is provisionally determined, then an output of voltage sensor 21 is stored as a first value in the internal memory of control apparatus 30.

When melting adhesion is provisionally determined, control apparatus 30 further provides control to once change the state of at least one of the plurality of system main relays and to return the changed state back. Thereafter, control apparatus 30 compares the first value and an output of voltage sensor 21 to thereby determine whether or not to confirm the provisional determination. Providing the control to once change the state of one of the plurality of system main relays and to return the changed state back, in some cases temporary fault may be normally recovered. Thus, whether or not the fault requires repair can be known.

Control apparatus 30 returns the part of relays back into the conductive state so as not to form a charging circuit to capacitor C1. Here, when a voltage value indicated by an output of voltage sensor 21 is increased from the voltage value indicated by the first value, control apparatus 30 confirms the provisional determination.

Figure 2:
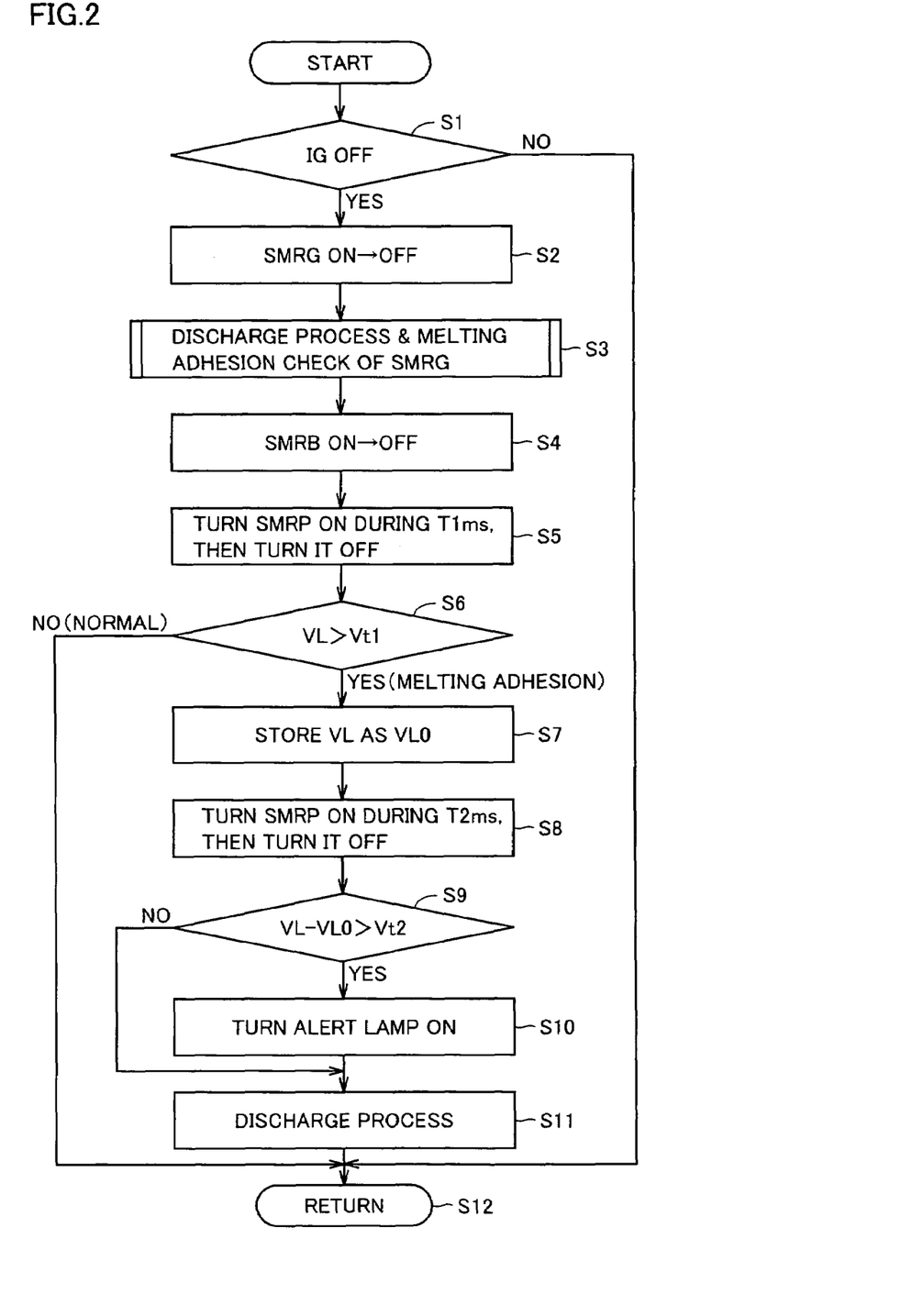
FIG. 2 is a flowchart showing a control structure of a fault diagnosing process executed at a control apparatus 30 in FIG. 1.

FIG. 2 is a flowchart indicative of a control structure of a fault diagnosing process executed by control apparatus 30 of FIG. 1.

Referring to FIG. 2, when the process is started, in step S1 control apparatus 30 of FIG. 1 first determines whether the ignition switch is turned off or not by the level of input signal IGON. If the ignition switch is not turned off, the process goes to step S12 and returns to the main routine.

On the other hand, if it is sensed that the ignition switch is turned off in step S1, then the process goes to step S2, where system main relay SMRG is switched from on to off. In step S3, the discharge process and the melt adhesion check of system main relay SMRG are conducted.

Next, in step S4, system main relay SMRB is switched from on to off.

Next, in step S5, system main relay SMRP is turned on during a time T1ms, and thereafter it is turned off.

Next, in step S6, an output of voltage sensor 21 is read to determine whether or not voltage value VL is greater than a prescribed threshold value Vt1. If VL>Vt1 is not satisfied, then the relay is operating normally. Therefore, the process goes to step S12 and control shifts to the main routine.

On the other hand, if VL>Vt1 is satisfied in step S6, it is considered that system main relay SMRB is involved with melting adhesion, and therefore melting adhesion is provisionally determined. In step S7, voltage value VL that is the output value of voltage sensor 21 at this time is stored as memory voltage value VL0 in the memory included in control apparatus 30.

In step S8, system main relay SMRP is turned on during a time T2ms, and thereafter it is turned off.

Next, using memory voltage value V0 that has been stored in step S9 and current voltage value VL whether or not to confirm the provisionally determined melting adhesion is determined. Specifically, whether or not VL−VL0>Vt2 is satisfied is determined. It is noted that Vt2 is a threshold value for determining an increase.

If VL−VL0>Vt2 is not satisfied in step S9, it is considered that in step S8 although system main relay SMRP was brought into conduction, system main relay SMRB was not conductive, and therefore voltage value VL sensed by voltage sensor 21 did not increase. Thus, it is considered that system main relay SMRB has now recovered from the temporary fault, and the process goes to step S11.

On the other hand, if VL−VL 0>Vt2 is satisfied in step S9, it is considered that system main relay SMRB has not recovered from the fault, and therefore the voltage between terminals of capacitor C1 has increased. Accordingly, the process goes to step S10, where control apparatus 30 turns an alert lamp on that is arranged at display device 35. When the process in step S10 ends, the process goes to step S11.

In step S11, the discharge process for discharging the charges stored in capacitor C1 is performed for the melting adhesion determination process. Then the process goes to step S12 and control returns back to the main routine.

Figure 3:
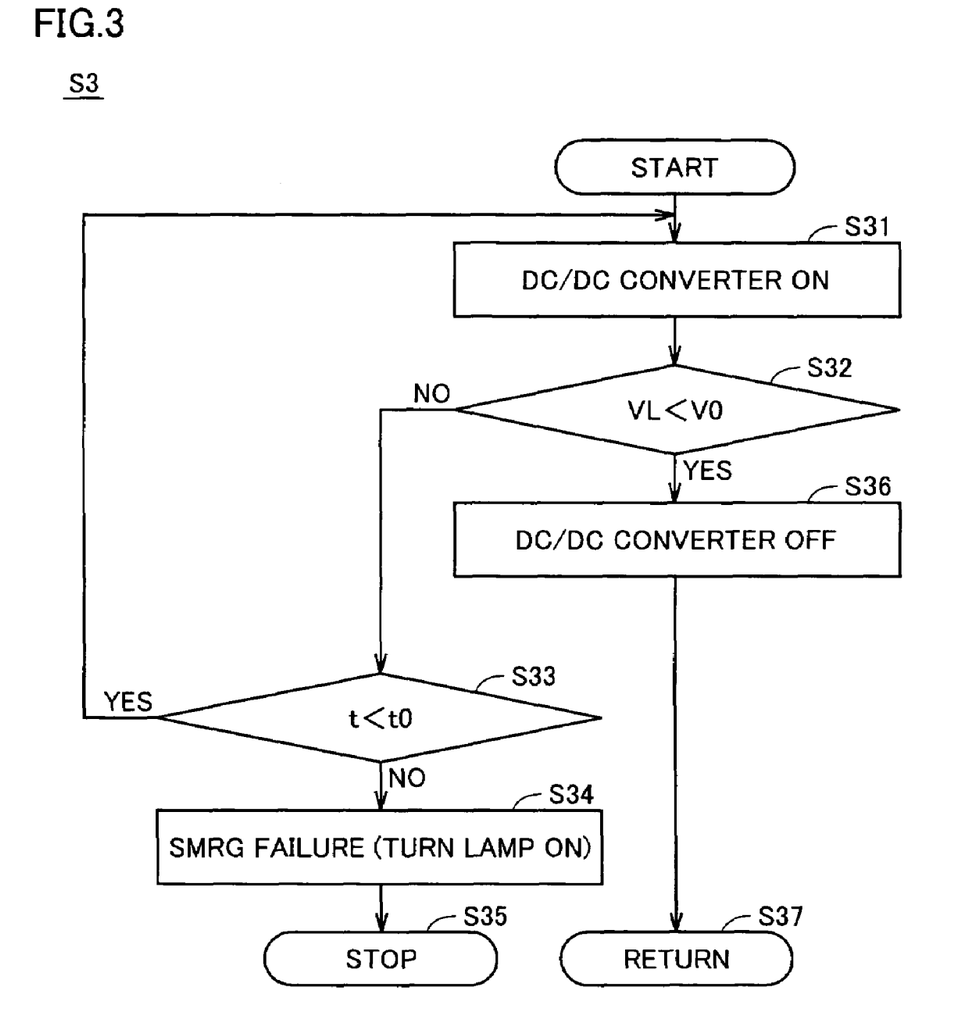
FIG. 3 is a flowchart showing detail of the process in step S3 in FIG. 2.

FIG. 3 is a flowchart showing in detail the process in step S3 in FIG. 2.

Referring to FIG. 3, when the process in step S3 is started, control apparatus 30 of FIG. 1 first allows DC/DC converter 42 to operate in step S31 to consume the charges stored in capacitor C1. It is noted that this discharge operation may be performed using other load circuit or a resistor for discharging.

Next, in step S32, it is determined whether or not voltage value VL monitored by voltage sensor 21 has decreased to be smaller than a prescribed value V0. If VL<V0 is not satisfied in step S32, discharging is insufficient and therefore the process goes to step S33.

In step S33, whether or not the time from start of the discharge process has exceeded a time guard value t0 is checked. If the time has not exceeded the time guard value t0 the process goes to step S31, where consumption of charges by the DC/DC converter is continued.

On the other hand, if the time of the discharge process has exceeded time guard value t0, the process goes to step S34. In this case, since the voltage between terminals of capacitor C1 does not decrease regardless of the current consumed by DC/DC converter 42, it is considered that system main relay SMRG is involved with failure of being fixed to the conductive state. Therefore, an alert lamp corresponding to the failure is turned on, and the process goes to step S35 to be stopped.

Meanwhile, if voltage value VL becomes smaller than prescribed value V0 in step S32, the process goes to step S36, and control apparatus 30 stops the operation of DC/DC converter 42. The process goes to step S37, and control returns to the main routine.

Figure 4:
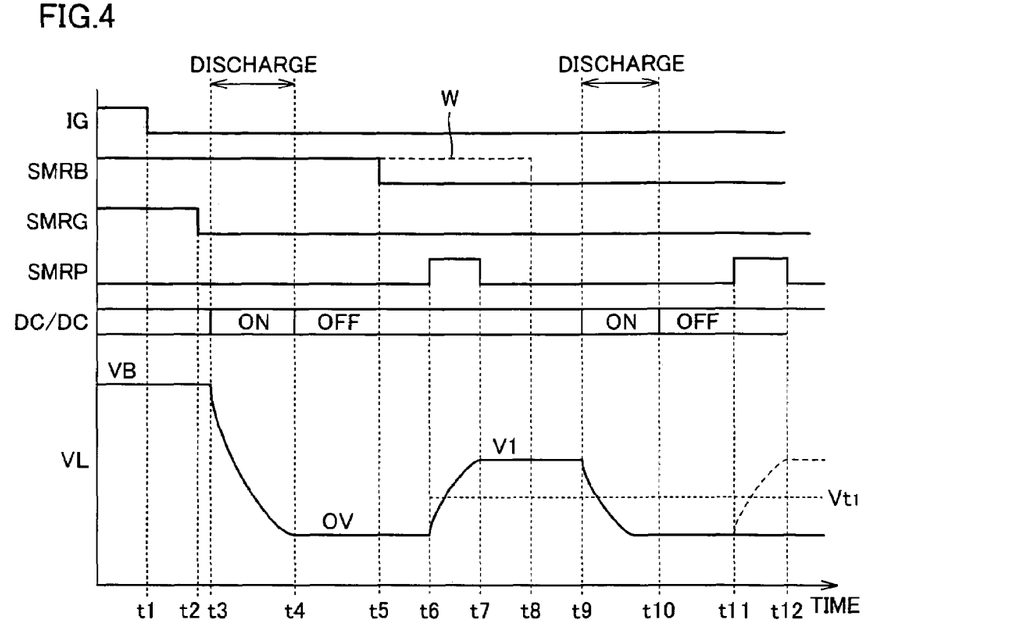
FIG. 4 is an operation waveform diagram showing an operation of a study example where discharging is conducted when retrying a determination.

FIG. 4 is an operation waveform diagram showing an operation in a study example where discharging is conducted when retrying a determination.

Referring to FIGS. 1 and 4, at time point t1, the ignition switch is set to off. In response, at time point t2, system main relay SMRG is controlled to be non-conductive, whereby a charging path to capacitor C1 is shut off.

Next, between time points t3-t4, control apparatus 30 allows DC/DC converter 42 connected to capacitor C1 to operate, to thereby conduct the discharge process, i.e., to discharge the charges stored in capacitor C1.

When the charges stored in capacitor C1 have thoroughly discharged by the consumption current of DC/DC converter 42 and the voltage of capacitor C1 approximates 0V, control apparatus 30 stops DC/DC converter 42 at time point t4.

Next, at time point t5, control apparatus 30 first provides control to turn off system main relay SMRB, in order to conduct the melting adhesion check of system main relay SMRB.

Here, when system main relay SMRB is involved with melting adhesion, regardless of control by control apparatus 30 to be off, system main relay SMRB remains to be conductive as indicated by a broken line of waveform W.

Here, when system main relay SMRP is brought into conduction between time points t6-t7, a charging path to capacitor C1 is shut off via resistor R, and voltage VL increases from 0V to V1.

Here, monitoring the output of voltage sensor 21, control apparatus 30 detects that voltage VL has exceeded threshold value voltage Vt1, and provisionally determines occurrence of melting adhesion of system main relay SMRB.

In order to ensure confirmation of the provisional determination, the discharge process of capacitor C1 is conducted again between time points t9-t10, and voltage VL returns to 0V. Again, between time points t11-t12, system main relay SMRP is brought into conduction.

If the conduction fault of system main relay SMRB has recovered by time point t8, voltage VL does not increase between time points t11-t12. Accordingly, voltage VL does not exceeds threshold value voltage Vt1 and not determined to be involved with fault, and the provisional determination is cancelled.

If the system main relay is still involved with the conduction fault after time point t8, the provisional determination having been made between time points t6-t7 is confirmed since voltage VL increases to exceeds threshold value voltage Vt1 between time points t11-t12 as indicated by the broken line. Then control apparatus 30 turns the alert lamp on that is at display device 35 to indicate the fault.

In the study example shown in FIG. 4, the discharge process must be conducted twice to confirm the fault determination. Therefore, an improvement in reducing time may be introduced.

Figure 5:
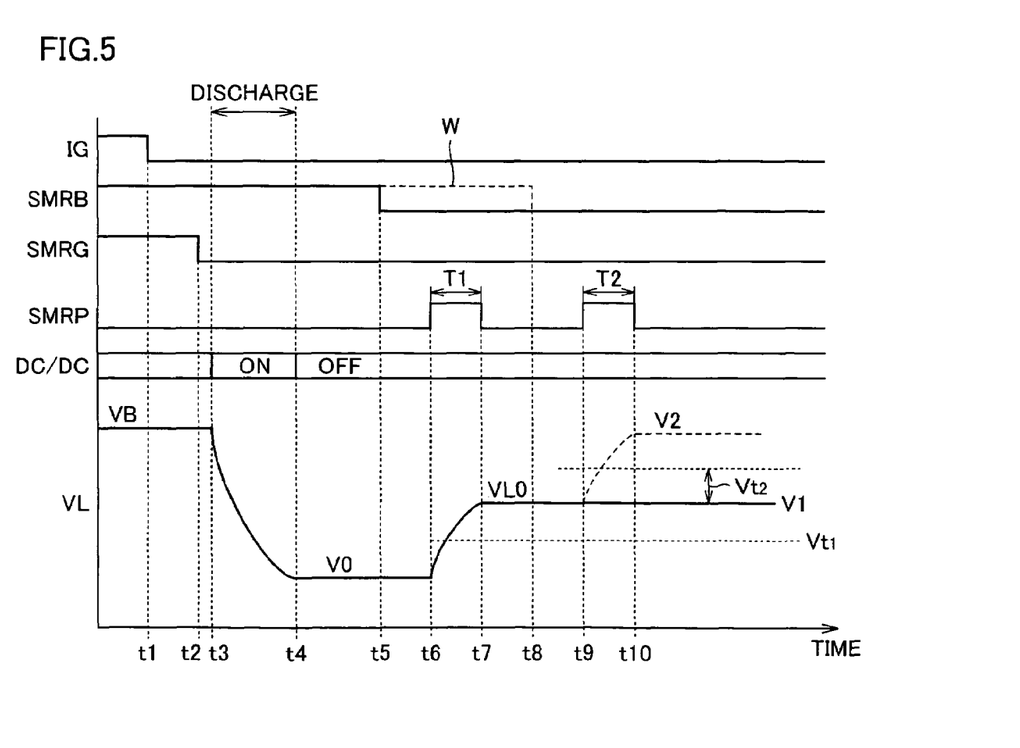
FIG. 5 is an operation waveform diagram when control is provided based on the flowchart of FIG. 2.

FIG. 5 is an operation waveform diagram when control is provided based on the flowchart of FIG. 2.

Referring to FIGS. 1 and 5, at time point t1, the ignition switch is set to off. In response, at time point t2, system main relay SMRG is controlled to be non-conductive, whereby a charging path to capacitor C1 is shut off (steps S1 and S2 in FIG. 2).

Next, between time points t3-t4, control apparatus 30 allows DC/DC converter 42 connected to capacitor C1 to operate, and thereby executes a process of discharging the charges stored in capacitor C1 (step S3 in FIG. 2).

When the charges stored in capacitor C1 have thoroughly discharged by the consumption current of DC/DC converter 42 and the voltage of capacitor C1 approximates 0V, control apparatus 30 stops DC/DC converter 42 at time point t4 (steps S32, S36 in FIG. 3).

Next, at time point t5, control apparatus 30 first provides control to turn off system main relay SMRB, in order to conduct the melting adhesion check of system main relay SMRB (step S4 in FIG. 2).

Here, when system main relay SMRB is involved with melting adhesion, regardless of control by control apparatus 30 to be off, system main relay SMRB remains to be conductive as indicated by a broken line of waveform W.

Here, between time points t6-t7, when system main relay SMRP is brought into conduction for T1 (ms), a charging path to capacitor C1 is shut off via resistor R, and voltage VL increases from 0V to V1 (step S5 in FIG. 2). Time T1 is set to a time such that, although voltage VL exceeds threshold value voltage Vt1 it is lower than battery voltage VB when there is melting adhesion, considering a time constant CR that is a product of resistor R and capacitance value of capacitor C1.

Here, monitoring the output of voltage sensor 21, control apparatus 30 detects that voltage VL has exceeded threshold value voltage Vt1, and provisionally determines occurrence of melting adhesion of system main relay SMRB (step S6 in FIG. 2).

When melting adhesion is provisionally determined, voltage V1 is stored as memory voltage value VL0 (step S7 in FIG. 2). Then, system main relay SMRP once returns to be off. Here, control apparatus 30 may provide on/off instructions for a plurality of times to system main relay SMRB in order to facilitate recovery from the conduction fault of system main relay SMRB. Providing the control to once change the state of at least one of the plurality of system main relays and to return the changed state back, in some cases temporary fault may be normally recovered. Thus, whether the fault requires repair or not can be known.

During time period T2 between time points t9-t10, control apparatus 30 provides control so that system main relay SMRP again turns on (step S8 in FIG. 2). Here, whether or not voltage VL has increased from memory voltage value VL0 is determined (step S9 in FIG. 2).

If voltage VL has not increased as indicated by a solid line after time point t9, the provisional determination of conductive fault of system main relay SMRB is reset. Then the discharge process is conducted, and the determination process ends (steps S11 and S12 in FIG. 2).

On the other hand, if voltage VL has increased further to V2 as indicated by a broken line after time point t9, the alert lamp is immediately turned on to notify the driver of the fault (step S10 in FIG. 2). Thereafter, the discharge process is performed and the determination process ends (steps S11, S12 in FIG. 2).

Although the melting adhesion check for the system main relay is conducted monitoring voltage VL in the present embodiment, the melting adhesion check for the system main relay may be conducted using a current value IB output from current sensor 11 shown in FIG. 1 in place of voltage VL.

As described above, according to the present embodiment of the present invention, as compared to the study example shown in FIG. 4, a time for at least one discharge operation can be reduced in the time for determining fault.

Accordingly, the driver can immediately be informed of fault before he/she leaves the vehicle when he/she finishes driving, and can have the vehicle repaired as required sooner.

Further, the finish operation can quickly be completed, so that the vehicle can shift quickly to a rest state where the high voltage power supply is shut off.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fault diagnosing apparatus for a vehicle,
said vehicle including
a direct current power supply,
an electric circuit supplied with a current from said direct current power supply,
a connecting portion that includes a plurality of relays and that connects and disconnects a path supplying the current from said direct current power supply to said electric circuit, and
a sensing portion monitoring the path between said connecting portion and said electric circuit; wherein
said fault diagnosing apparatus comprises a control portion providing control to connect and disconnect said connecting portion, wherein
said control portion brings part of said plurality of relays into conduction to make a provisional determination of conduction fault of a relay that is to be non-conductive in accordance with an output of said sensing portion, and when a result of said provisional determination indicates fault, said control portion stores the output of said sensing portion as a first value and provides control to once change a state of at least one of said plurality of relays and to return the changed state back, and thereafter compares said first value and another output of said sensing portion to determine whether or not to confirm said provisional determination.

2. The fault diagnosing apparatus for a vehicle according to claim 1, wherein one of said plurality of relays is a first relay connecting a positive electrode side of said direct current power supply to said electric circuit, and another one of said plurality of relays is a second relay connecting a negative electrode side of said direct current power supply to said electric circuit.

3. The fault diagnosing apparatus for a vehicle according to claim 1, wherein said vehicle further includes a capacitor smoothing a voltage applied from said connecting portion to said electric circuit, said sensing portion includes a voltage sensor sensing a voltage between terminals of said capacitor, and said controlling portion allows said electric circuit to operate to discharge said capacitor, and thereafter makes said provisional determination.

4. The fault diagnosing apparatus for a vehicle according to claim 3, wherein said controlling portion confirms said provisional determination when a voltage value indicated by an output of said sensing portion is increased from a voltage value indicated by said first value when said part of said plurality of relays are again brought into conduction.

5. A fault diagnosing method for a vehicle, said vehicle including a direct current power supply, an electric circuit supplied with a current from said direct current power supply, a connecting portion that includes a plurality of relays and that connects and disconnects a path supplying the current from said direct current power supply to said electric circuit, and a sensing portion monitoring the path between said connecting portion and said electric circuit; wherein said fault diagnosing method comprises the steps of:

bringing part of said plurality of relays into conduction to make a provisional determination of conduction fault of a relay that is to be non-conductive in accordance with an output of said sensing portion;

when a result of said provisional determination indicates fault, storing the output of said sensing portion as a first value;

when the result of said provisional determination indicates fault, providing control to once change a state of at least one of said plurality of relays and to return the changed state back; and comparing said first value and another output of said sensing portion to determine whether or not to confirm said provisional determination.

6. The fault diagnosing method for a vehicle according to claim 5, wherein one of said plurality of relays is a first relay connecting a positive electrode side of said direct current power supply to said electric circuit, and another one of said plurality of relays is a second relay connecting a negative electrode side of said direct current power supply to said electric circuit.

7. The fault diagnosing method for a vehicle according to claim 5, wherein said vehicle further includes a capacitor smoothing a voltage applied from said connecting portion to said electric circuit, said sensing portion includes a voltage sensor sensing a voltage between terminals of said capacitor, and said fault diagnosing method further includes a step of, prior to the step of making a provisional determination, allowing said electric circuit to operate to discharge said capacitor.

8. The fault diagnosing method for a vehicle according to claim 7, wherein said fault diagnosing method confirms said provisional determination when a voltage value indicated by an output of said sensing portion is increased from a voltage value indicated by said first value in said step of determining whether or not to confirm said provisional determination.

* * * * *